US006585597B2

(12) United States Patent
Finn

(10) Patent No.: US 6,585,597 B2
(45) Date of Patent: *Jul. 1, 2003

(54) IMPULSE RADIO INTERACTIVE WIRELESS GAMING SYSTEM, GAMING UNIT, GAME SERVER AND METHOD

(75) Inventor: James S. Finn, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/873,747

(22) Filed: Jun. 4, 2001

(65) Prior Publication Data

US 2002/0052239 A1 May 2, 2002

Related U.S. Application Data

(63) Continuation of application No. 09/666,115, filed on Sep. 20, 2000, now Pat. No. 6,354,946.

(51) Int. Cl.⁷ .................................................. A63F 13/00
(52) U.S. Cl. ....................................... 463/40; 463/39
(58) Field of Search ............................. 463/40, 41, 42, 463/39; 342/375, 132, 457, 463; 375/200, 206, 208, 210, 239, 259, 295

(56) References Cited

U.S. PATENT DOCUMENTS

| 4,572,509 A | 2/1986 | Sitrick | 273/85 |
|---|---|---|---|
| 4,641,317 A | 2/1987 | Fullerton | 375/1 |
| 4,743,906 A | 5/1988 | Fullerton | 342/27 |
| 4,813,057 A | 3/1989 | Fullerton | 375/37 |
| 4,951,039 A | 8/1990 | Schwendeman et al. | 340/725 |
| 4,979,186 A | 12/1990 | Fullerton | 375/1 |
| 5,048,831 A | 9/1991 | Sides | 273/85 |
| 5,363,108 A | 11/1994 | Fullerton | 342/27 |
| 5,618,045 A | 4/1997 | Kagan et al. | 463/40 |
| 5,677,927 A | 10/1997 | Fullerton et al. | 375/200 |
| 5,687,169 A | 11/1997 | Fullerton | 370/324 |
| 5,738,583 A | 4/1998 | Comas et al. | 463/40 |
| 5,832,035 A | 11/1998 | Fullerton | 375/210 |
| 5,942,969 A | 8/1999 | Wicks | 340/286.02 |
| 6,031,862 A | 2/2000 | Fullerton et al. | 375/200 |
| 6,133,876 A | 10/2000 | Fullerton et al. | 342/375 |

FOREIGN PATENT DOCUMENTS

GB           2 344 539 A        6/2000

OTHER PUBLICATIONS

PCT International Search Report for International Application No. PCT/US01/18790 dated Feb. 1, 2002.

Primary Examiner—Michael O'Neill
(74) Attorney, Agent, or Firm—James S. Finn; William J. Tucker

(57) ABSTRACT

An interactive wireless gaming system is provided which utilizes the significant wireless improvements of impulse radio technology to enable gaming system enhancements. For instance, the interactive wireless gaming system has a plurality of impulse radio wireless gaming units operating alternately as a host device and a guest device. Each impulse radio wireless gaming unit includes an impulse radio receiver for receiving impulse radio wireless messages including gaming information from a game server, a display for displaying the received gaming information, a processor for generating updated gaming information, and an impulse radio transmitter for transmitting impulse radio wireless messages including the updated gaming information to said game server. The game server then uses impulse radio technology to interact with and provide the updated gaming information to the other impulse radio wireless gaming units.

21 Claims, 15 Drawing Sheets

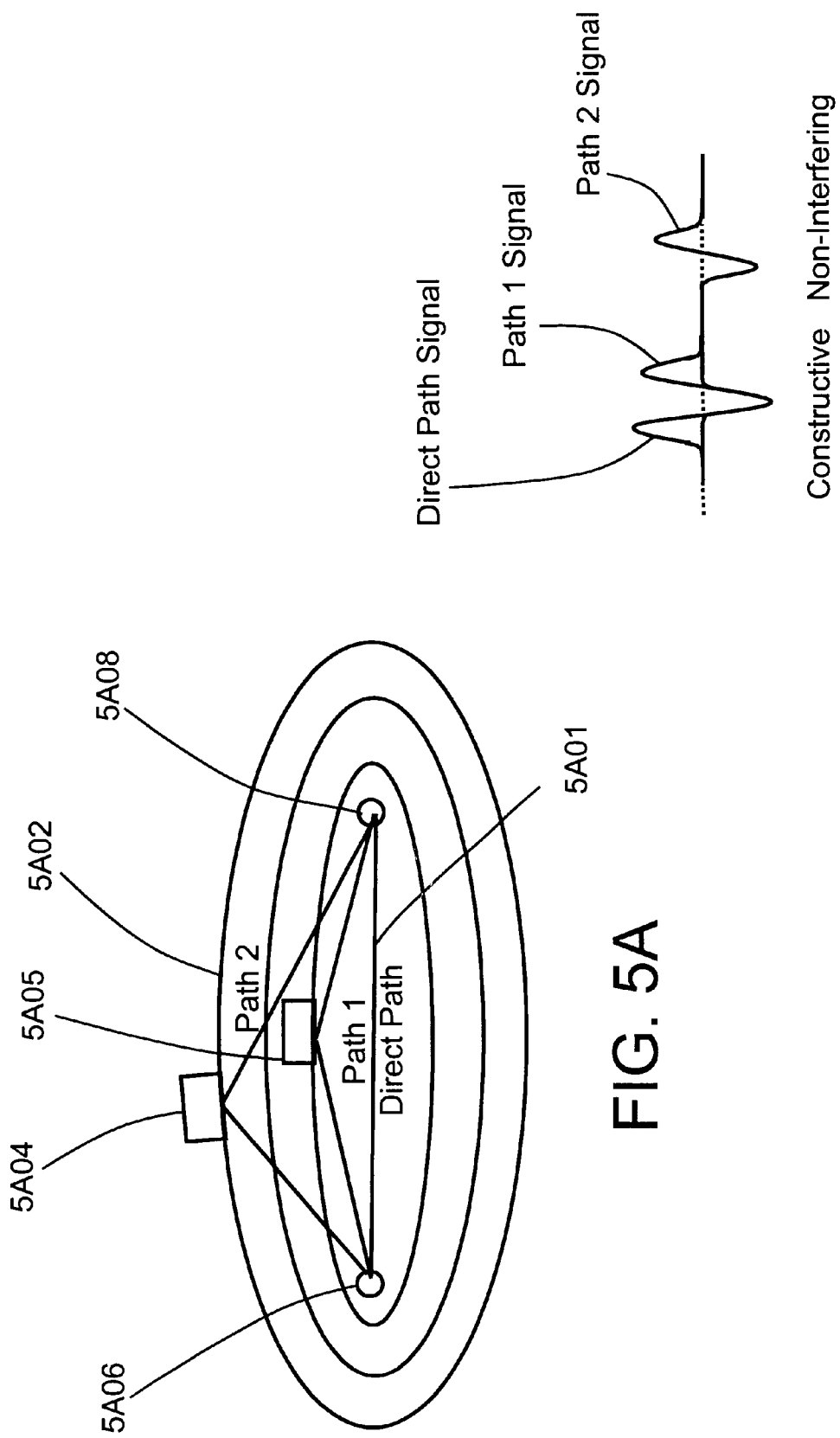

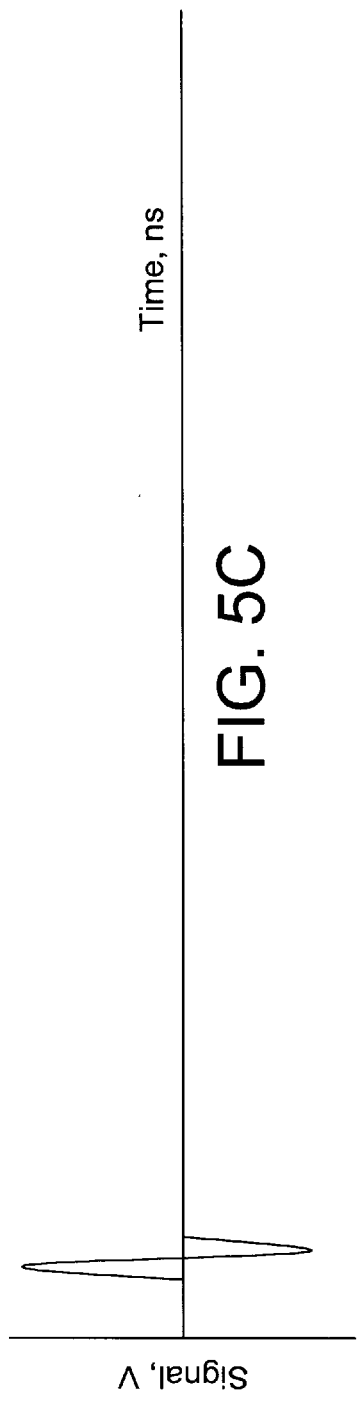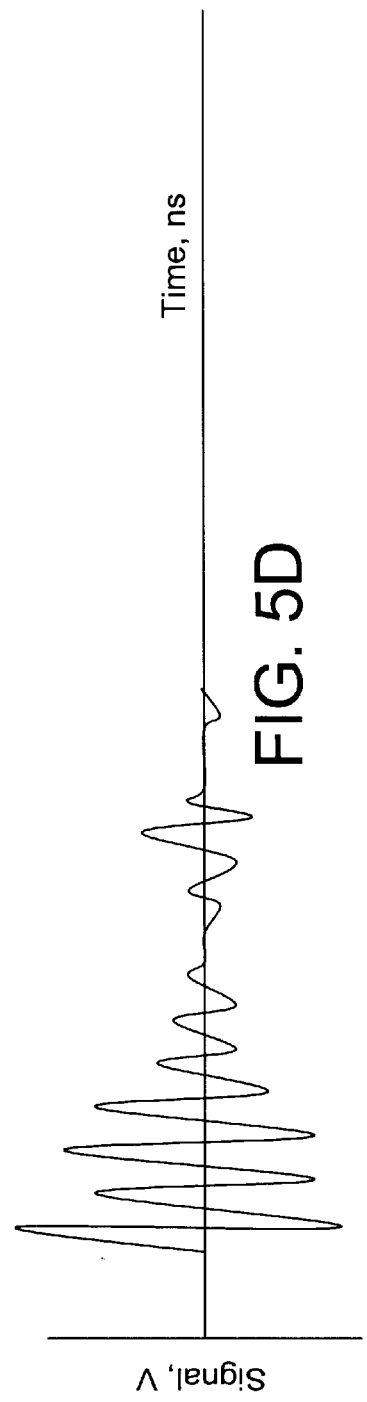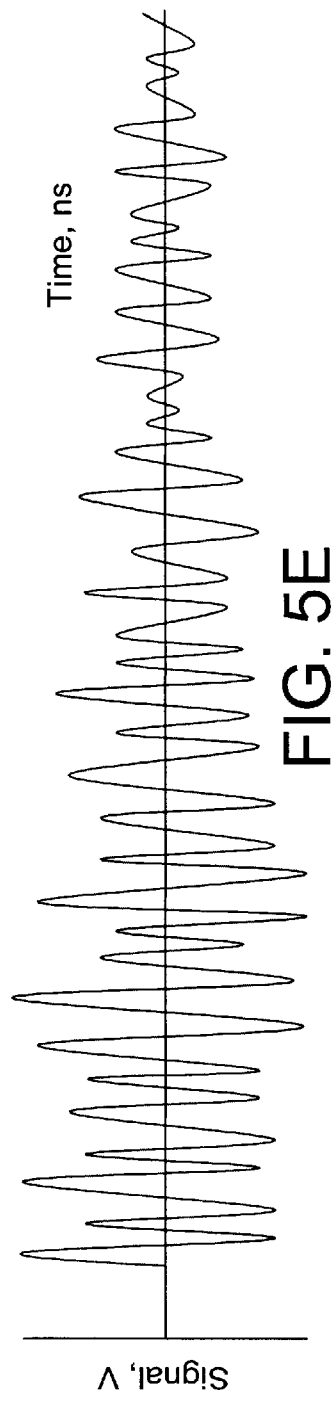

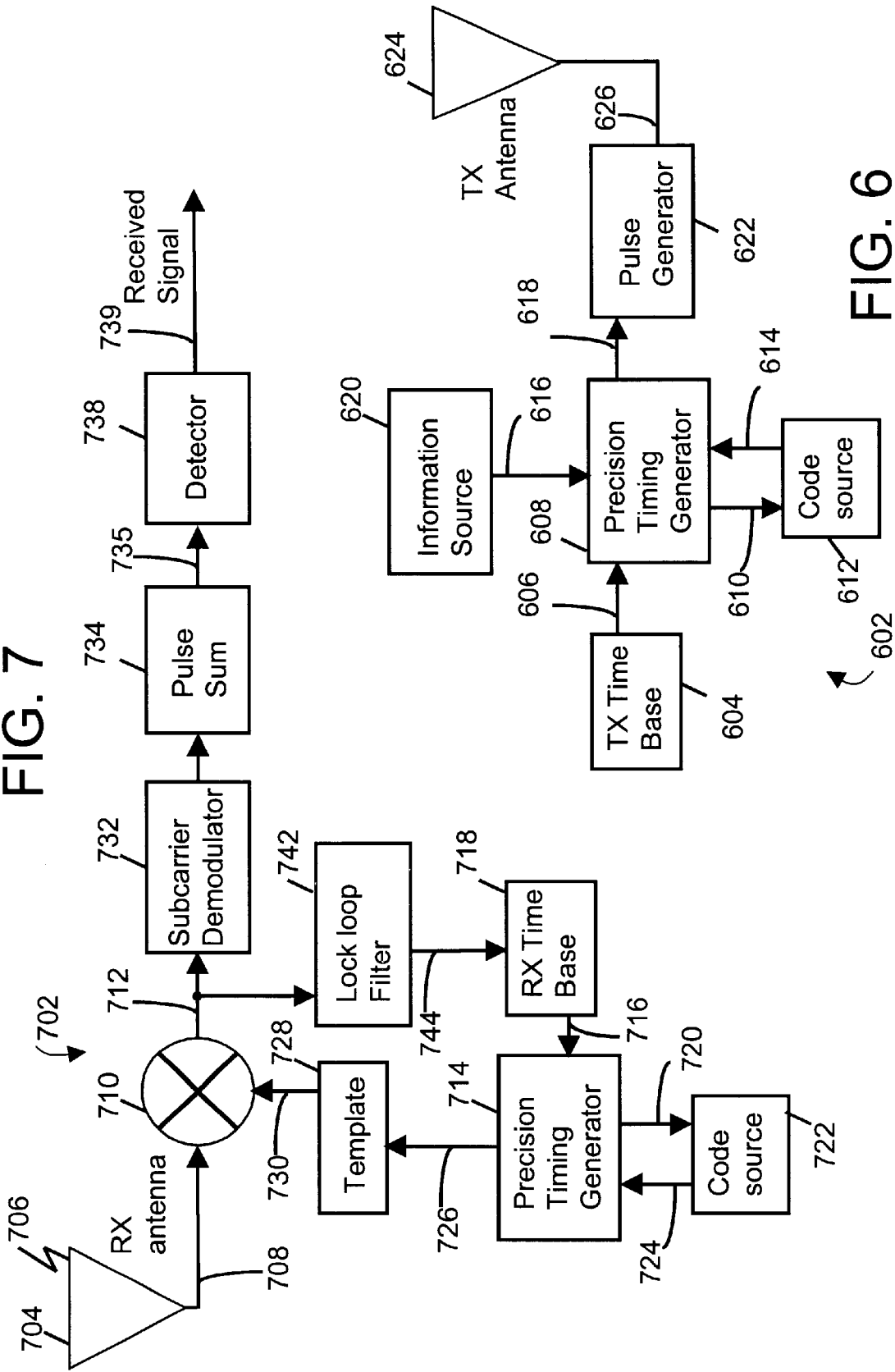

IMPULSE RADIO INTERACTIVE WIRELESS GAMING SYSTEM, GAMING UNIT, GAME SERVER AND METHOD

This application is a Continuation of prior application Ser. No. 09/666,115 filed on Sep. 20, 2000, now U.S. Pat. No. 6,354,946.

BACKGROUND OF THE INVENTION

1. Field of the Invention

This present invention relates to a system and method of transmitting and receiving gaming information and more particularly to a system and method which utilizes impulse radio technology to allow gaming users to communicate either with a host system or other gaming users in an interactive and wireless fashion.

2. Background of the Invention and Related Art

There are currently several systems allowing gaming users to either communicate with a host system or to communicate directly with each other. Such systems include Compuserve, America Online, as well as various Bulletin Board services. One of the disadvantages of such systems is that they require standard telephone lines in order to properly operate. For example, a gaming user on one of these systems is required to dedicate a telephone line in order to participate in communications with either a host system or other gaming users. Another disadvantage to such systems is that they are not sufficiently mobile to allow gaming users flexibility in their movements and travels if they wish to retain the interactive capability. As a result, in order for two or more gaming users to directly communicate with a host system or one another, the gaming users must either be within close proximity to one another to allow for a cabled connection or, in the alternative, communicate through a telephone line.

To overcome these disadvantages, wireless communication devices have been developed such as described in U.S. Pat. No. 4,951,039, to Schwendeman et al. (the '039 patent) which discloses a portable communications receiver. Although the invention allows for receiving and detecting periodically updated information in a wireless fashion, it does not allow for interactive communication.

Further, a wireless means for interactive communication has been developed such as described in U.S. Pat. No. 5,738,583, to Comas et al. (the '583 patent) which discloses an interactive wireless gaming system having a plurality of wireless gaming units operating alternately as a host device and a guest device. The wireless gaming units further comprise a receiver for receiving wireless messages which includes gaming information generated by the gaming units with the gaming information having periodically updated data signals which indicate a present position of a plurality of moveable objects moving periodically as the data signals are updated. However, although the '583 patent discloses wireless means for the information transfer, it is plagued by problems associated with existing wireless technologies such as multipath problems, higher power requirements, limited bandwidth and the lack of position determination by the wireless device.

Thus, there is a need in the art to provide a system allowing for the communication between a gaming user and a host system or with other gaming users in an interactive fashion and using a wireless means which overcomes the shortcomings of existing wireless technologies.

There is an additional need in the art to provide a system allowing for the communication between a gaming user with a host system or with other gaming users through a paging network using current paging technology combined with improved wireless techniques.

Further, there is an need in the art to provide a system allowing for the communication between a gaming user with a host system or with other gaming users wherein the wireless means for information transfer also provides location information of the gaming user's remote device.

BRIEF DESCRIPTION OF THE INVENTION

It is therefore one object of the present invention to provide an interactive wireless gaming system which utilizes the significant wireless improvements of impulse radio technology for gaming system enhancements. For instance, the interactive wireless gaming system has a plurality of impulse radio wireless gaming units operating alternately as a host device and a guest device. Each impulse radio wireless gaming unit includes an impulse radio receiver for receiving impulse radio wireless messages including gaming information from a game server, a display for displaying the received gaming information, a processor for generating updated gaming information, and an impulse radio transmitter for transmitting impulse radio wireless messages including the updated gaming information to said game server. The game server then uses impulse radio technology to interact with and provide the updated gaming information to the other impulse radio wireless gaming units.

BRIEF DESCRIPTION OF THE DRAWINGS

The present invention is described with reference to the accompanying drawings. In the drawings, like reference numbers indicate identical or functionally similar elements.

FIG. 5A illustrates a typical geometrical configuration giving rise to multipath received signals;

FIG. 5B illustrates exemplary multipath signals in the time domain;

FIGS. 5C–5E illustrate a signal plot of various multipath environments.

FIG. 6 illustrates a representative impulse radio transmitter functional diagram;

FIG. 7 illustrates a representative impulse radio receiver functional diagram;

DETAILED DESCRIPTION OF THE EMBODIMENTS

Overview of the Invention

Figure 1B:
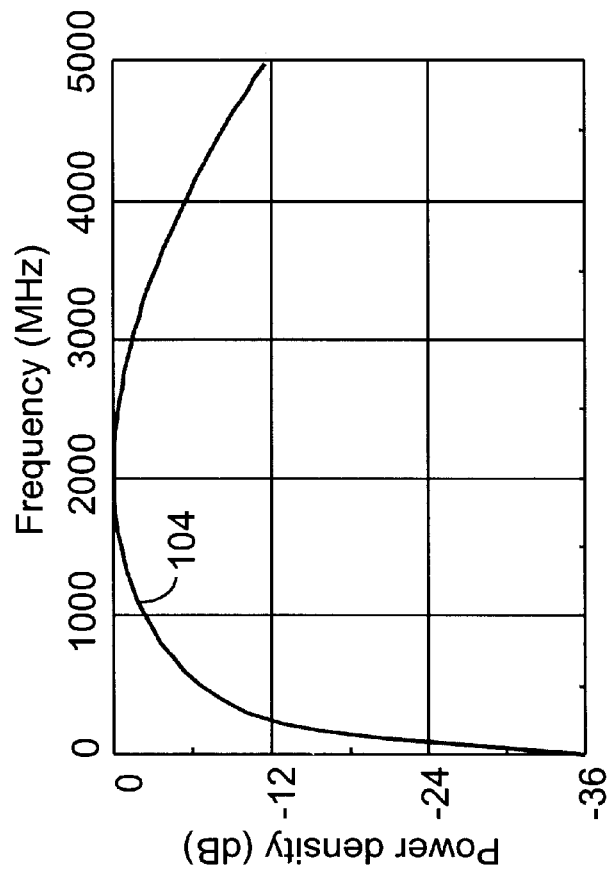
FIG. 1B illustrates the frequency domain amplitude of the Gaussian Monocycle of FIG. 1A.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Recent advances in communications technology have enabled an emerging, revolutionary ultra wideband technology (UWB) called impulse radio communications systems (hereinafter called impulse radio). To better understand the benefits of impulse radio to the present invention, the following review of impulse radio follows Impulse radio was first fully described in a series of patents, including U.S. Pat. Nos. 4,641,317 (issued Feb. 3, 1987), 4,813,057 (issued Mar. 14, 1989), 4,979,186 (issued Dec. 18, 1990) and 5,363,108 (issued Nov. 8, 1994) to Larry W. Fullerton. A second generation of impulse radio patents includes U.S. Pat. Nos. 5,677,927 (issued Oct. 14, 1997), 5,687,169 (issued Nov. 11, 1997) and 5,832,035 (issued Nov. 3, 1998) to Fullerton et al.

Uses of impulse radio systems are described in U.S. Pat. No. 6,177,903 entitled, "System and Method for Intrusion Detection using a Time Domain Radar Array" and U.S. Pat. No. 6,218,979 entitled, "Wide Area Time Domain Radar Array" both of which are assigned to the assignee of the present invention. These patents are incorporated herein by reference.

Impulse Radio Basics

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a code component. Generally, conventional spread spectrum systems employ codes to spread the normally narrow band information signal over a relatively wide band of frequencies. A conventional spread spectrum receiver correlates these signals to retrieve the original information signal. Unlike conventional spread spectrum systems, in impulse radio communications codes are not needed for energy spreading because the monocycle pulses themselves have an inherently wide bandwidth. Instead, codes are used for channelization, energy smoothing in the frequency domain, resistance to interference, and reducing the interference potential to nearby receivers.

The impulse radio receiver is typically a direct conversion receiver with a cross correlator front end which coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where, $\sigma$ is a time scaling parameter, t is time, $f_{mono}(t)$ is the waveform voltage, and
e is the natural logarithm base.

Figure 1A:
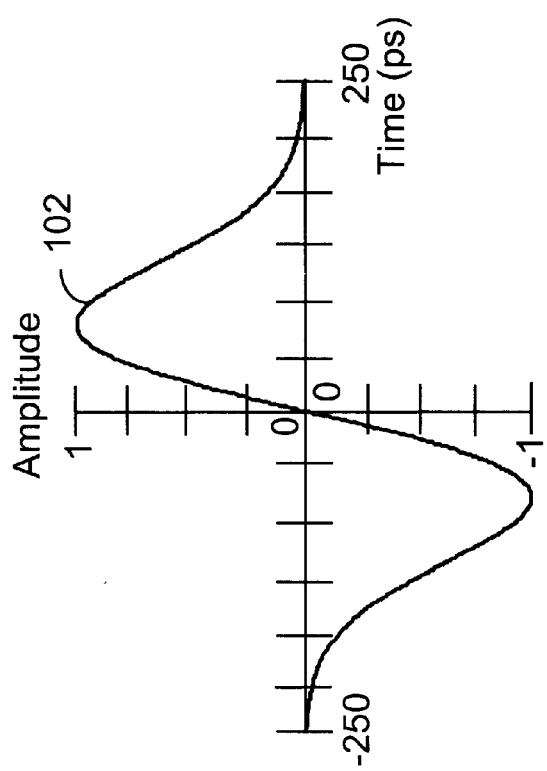
FIG. 1A illustrates a representative Gaussian Monocycle waveform in the time domain.

The frequency domain spectrum of the above waveform is shown in FIG. 1B. The corresponding equation is:

$$F_{mono}(f) = (2\pi)^{\frac{3}{2}} \sigma f e^{-2(\pi \sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2B:
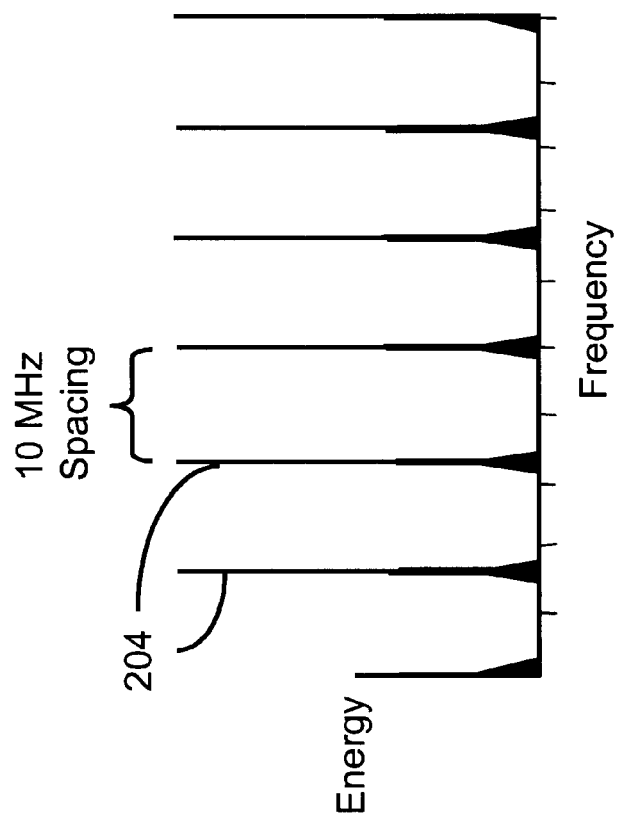
FIG. 2B illustrates the frequency domain amplitude of the waveform of FIG. 2A.
Figure 2A:
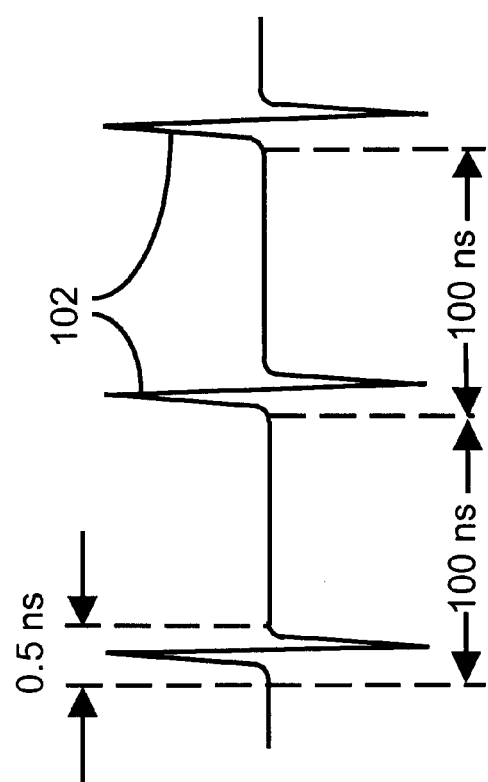
FIG. 2A illustrates a pulse train comprising pulses as in FIG. 1A.

Prototypes have been built which have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHZ at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the fill spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to a receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by non-uniformly positioning each pulse relative to its nominal position according to a code such as a pseudo random code.

Figure 3:
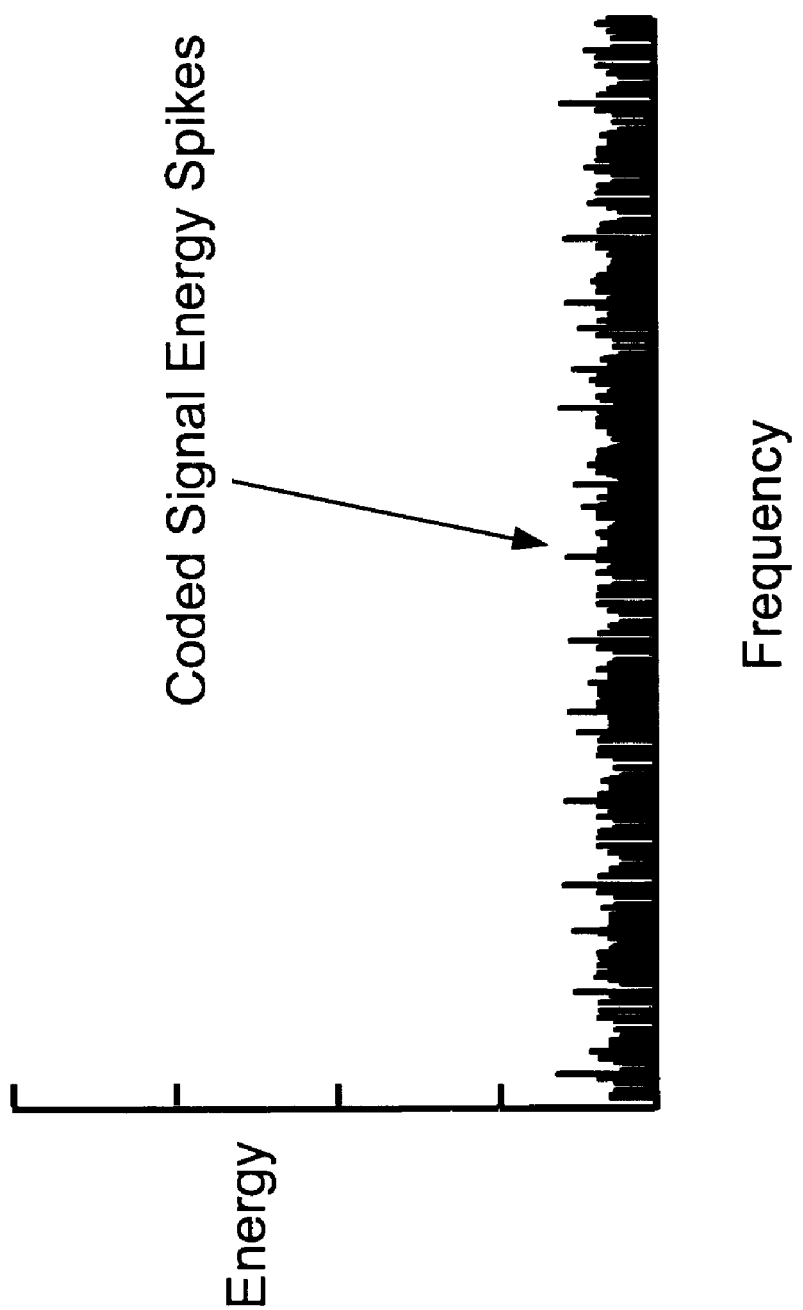
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining pseudo-random positioning for each pulse in a sequence of pulses). FIG. 3, when compared to FIG. 2B, shows that the impact of using a PN code is to destroy the comb line structure and spread the energy more uniformly. This structure typically has slight variations that are characteristic of the specific code used.

Coding also provides a method of establishing independent communication channels using impulse radio. Codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to code dither) in response to the information signal. This amount is typically very small relative to the code shift. In a 10 Mpps system with a center frequency of 2 GHz., for example, the code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

Reception and Demodulation

Clearly, if there were a large number of impulse radio users within a confined area, there might be mutual interference. Further, while coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The code helps impulse systems discriminate between the intended impulse transmission and interfering transmissions from others.

Figure 4:
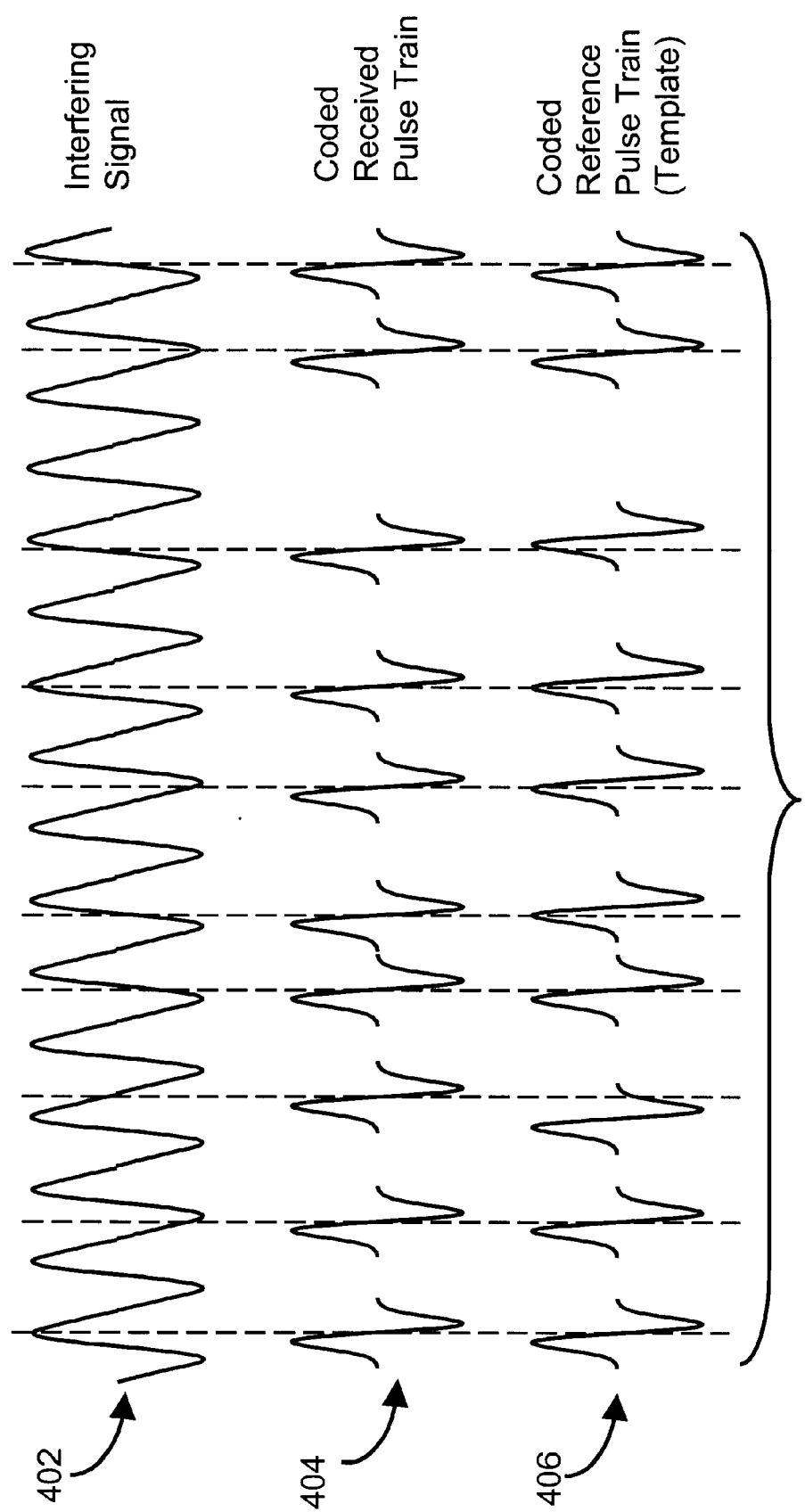
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a code dithered template signal 406. Without coding, the cross correlation would sample the interfering signal 402 with such regularity that the interfering signals could cause significant interference to the impulse radio receiver. However, when the transmitted impulse signal is encoded with the code dither (and the impulse radio receiver template signal 406 is synchronized with that identical code dither) the correlation samples the interfering signals non-uniformly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 KHz information bandwidth and a 10 MHz channel bandwidth yields a processing gain of 1000 or 30 dB. However, far greater processing gains are achieved by impulse radio systems, where the same 10 KHz information bandwidth is spread across a much greater 2 GHz channel bandwidth, resulting in a theoretical processing gain of 200,000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight-line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal that propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. In this situation, the direct path signal power is small relative to the total signal power from the reflections.

An impulse radio receiver can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be cancelled simultaneously and precisely while blocking the direct path—a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{1}{\sigma^2} \exp\left(\frac{-r^2}{2\sigma^2}\right)$$

where r is the envelope amplitude of the combined multipath signals, and $2\sigma^2$ is the RMS power of the combined multipath signals.

Figure 5F:
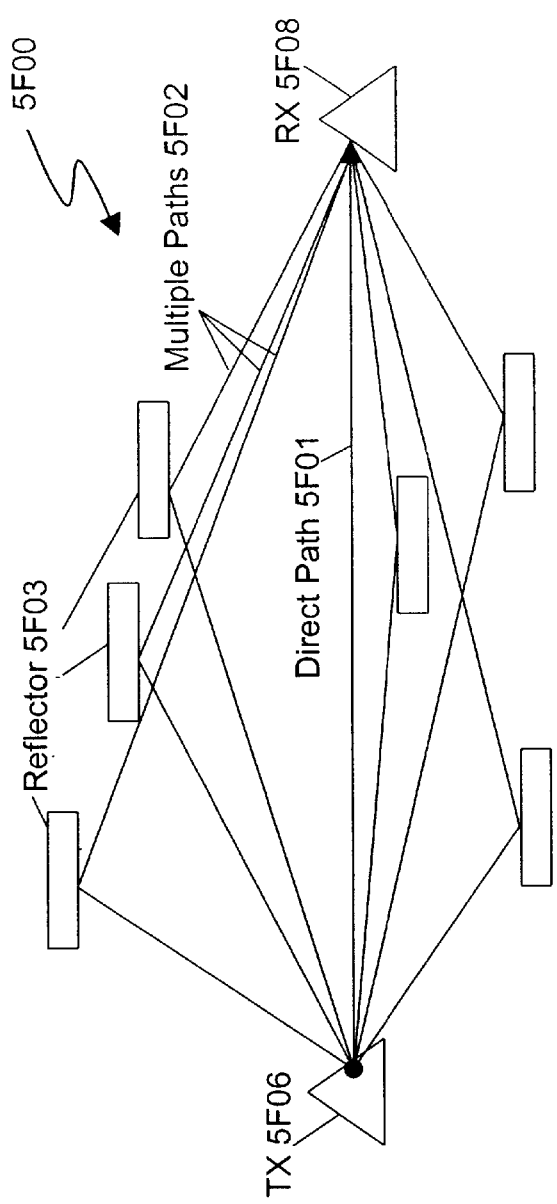
FIG. 5F illustrates a plurality of multipaths with a plurality of reflectors from a transmitter to a receiver.
Figure 5G:
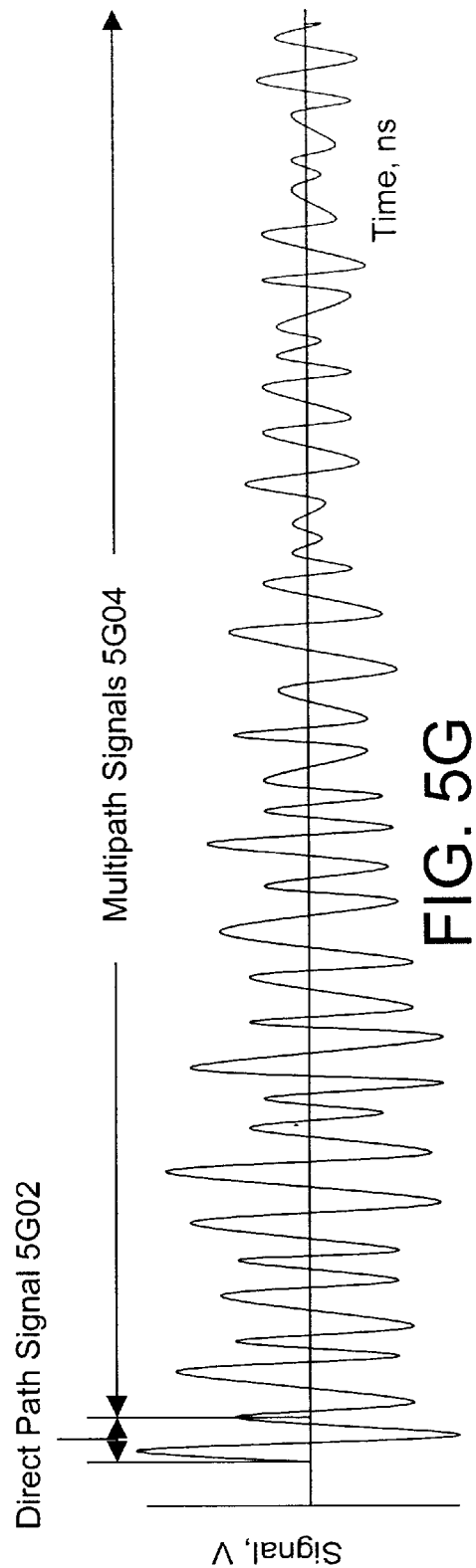
FIG. 5G graphically represents signal strength as volts vs. time in a direct path and multipath environment.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIG. 5F and 5G in a transmit and receive system in a high multipath environment 5F00, wherein the transmitter 5F06 transmits to receiver 5F08 with the signals reflecting off reflectors 5F03 which form multipaths 5F02. The direct path is illustrated as 5F01 with the signal graphically illustrated at 5G02, with the vertical axis being the signal strength in volts and horizontal axis representing time in nanoseconds. Multipath signals are graphically illustrated at 5G04.

Distance Measurement

Important for positioning, impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, U.S. Pat. No. 6,133,876, issued Oct. 17, 2000, titled "System and Method for Position Determination by Impulse Radio," and U.S. Pat. No. 6,111,536, issued Aug. 29, 2000, titled "System and Method for Distance Measurement by Inphase and Quadrature Signals in a Radio System," both of which are incorporated herein by reference.

In addition to the methods articulated above, impulse radio technology along with Time Division Multiple Access algorithms and Time Domain packet radios can achieve geo-positioning capabilities in a radio network. This geo-positioning method allows ranging to occur within a network of radios without the necessity of a full duplex exchange among every pair of radios.

Exemplary Transceiver Implementation

Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618. The code source 612 comprises a storage device such as a random access memory (RAM), read only memory (ROM), or the like, for storing suitable codes and for outputting the PN codes as a code signal 614. Alternatively, maximum length shift registers or other computational means can be used to generate the codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This bandpass filtering will cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710 via a receiver transmission line, coupled to the receive antenna 704, and producing a baseband output 712.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 ideally comprises a multiplier followed by a short term integrator to sum the multiplier product over the pulse interval.

The output of the correlator 710 is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to determine an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to generate an error signal 744. The error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8A:
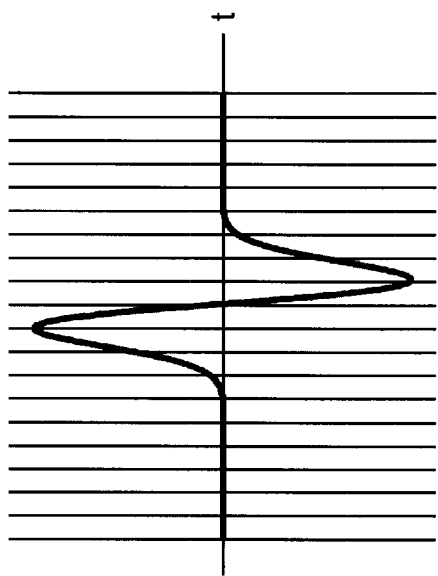
FIG. 8A illustrates a representative received pulse signal at the input to the correlator.
Figure 8B:
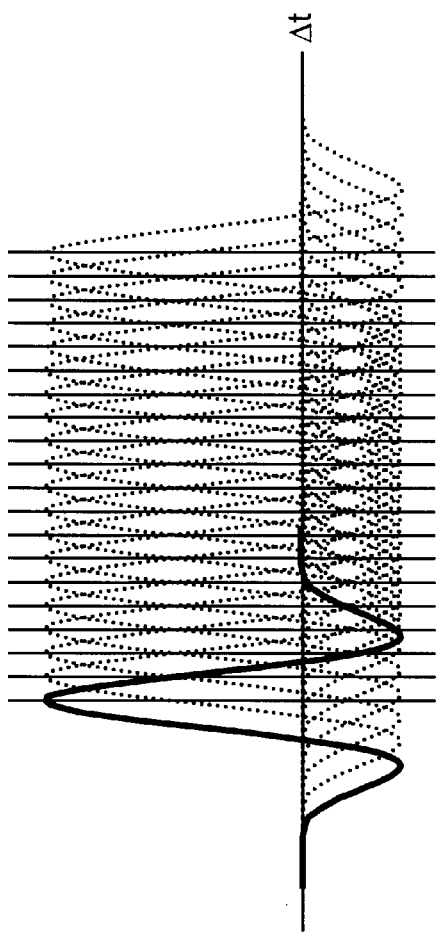
FIG. 8B illustrates a sequence of representative impulse signals in the correlation process.
Figure 8C:
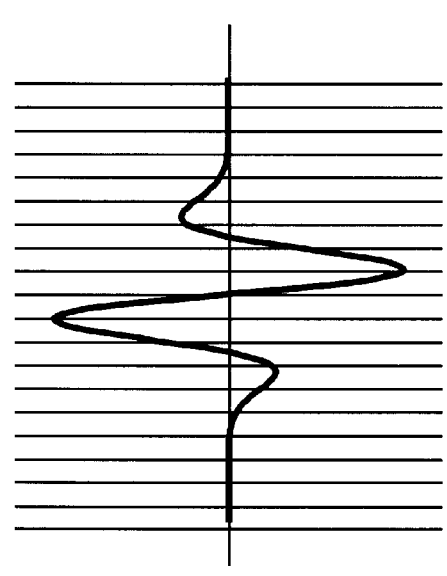
FIG. 8C illustrates the output of the correlator for each of the time offsets of FIG. 8B.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph does not show a waveform that is a function of time, but rather a function of time-offset. For any given pulse received, there is only one corresponding point that is applicable on this graph. This is the point corresponding to the time offset of the template signal used to receive that pulse. Further examples and details of precision timing can be found described in U.S. Pat. Nos. 5,677,927 and 6,304,623 both of which are incorporated herein by reference.

Recent Advances in Impulse Radio Communication

Modulation Techniques

To improve the placement and modulation of pulses and to find new and improved ways that those pulses transmit information, various modulation techniques have been developed. The modulation techniques articulated above as well as the recent modulation techniques invented and summarized below are incorporated herein by reference.

FLIP Modulation

An impulse radio communications system can employ FLIP modulation techniques to transmit and receive flip modulated impulse radio signals. Further, it can transmit and receive flip with shift modulated (also referred to as quadrature flip time modulated (QFTM)) impulse radio signals. Thus, FLIP modulation techniques can be used to create two, four, or more different data states.

Flip modulators include an impulse radio receiver with a time base, a precision timing generator, a template generator, a delay, first and second correlators, a data detector and a time base adjustor. The time base produces a periodic timing signal that is used by the precision timing generator to produce a timing trigger signal. The template generator uses the timing trigger signal to produce a template signal. A delay receives the template signal and outputs a delayed template signal. When an impulse radio signal is received, the first correlator correlates the received impulse radio signal with the template signal to produce a first correlator output signal, and the second correlator correlates the received impulse radio signal with the delayed template signal to produce a second correlator output signal. The data detector produces a data signal based on at least the first correlator output signal. The time base adjustor produces a time base adjustment signal based on at least the second correlator output signal. The time base adjustment signal is used to synchronize the time base with the received impulse radio signal.

For greater elaboration of FLIP modulation techniques, the reader is directed to the patent application entitled, "Apparatus, System and Method for FLIP Modulation in an Impulse Radio Communication System", Ser. No. 09/537, 692, filed Mar. 29, 2000 and assigned to the assignee of the present invention. This patent is incorporated herein by reference.

Vector Modulation

Vector Modulation is a modulation technique which includes the steps of generating and transmitting a series of time-modulated pulses, each pulse delayed by one of four pre-determined time delay periods and representative of at least two data bits of information, and receiving and demodulating the series of time-modulated pulses to estimate the data bits associated with each pulse. The apparatus includes an impulse radio transmitter and an impulse radio receiver.

The transmitter transmits the series of time-modulated pulses and includes a transmitter time base, a time delay modulator, a code time modulator, an output stage, and a transmitting antenna. The receiver receives and demodulates the series of time-modulated pulses using a receiver time base and two correlators, one correlator designed to operate after a pre-determined delay with respect to the other correlator. Each correlator includes an integrator and a comparator, and may also include an averaging circuit that calculates an average output for each correlator, as well as a track and hold circuit for holding the output of the integrators. The receiver further includes an adjustable time delay circuit that may be used to adjust the pre-determined delay between the correlators in order to improve detection of the series of time-modulated pulses.

For greater elaboration of Vector modulation techniques, the reader is directed to the patent application entitled, "Vector Modulation System and Method for Wideband Impulse Radio Communications", Ser. No. 09/169,765, filed Dec. 9, 1999 and assigned to the assignee of the present invention. This patent application is incorporated herein by reference.

Receivers

Because of the unique nature of impulse radio receivers several modifications have been recently made to enhance system capabilities.

Multiple Correlator Receivers

Multiple correlator receivers utilize multiple correlators that precisely measure the impulse response of a channel and wherein measurements can extend to the maximum communications range of a system, thus, not only capturing ultra-wideband propagation waveforms, but also information on data symbol statistics. Further, multiple correlators enable rake acquisition of pulses and thus faster acquisition, tracking implementations to maintain lock and enable various modulation schemes. Once a tracking correlator is synchronized and locked to an incoming signal, the scanning correlator can sample the received waveform at precise time delays relative to the tracking point. By successively increasing the time delay while sampling the waveform, a complete, time-calibrated picture of the waveform can be collected.

For greater elaboration of utilizing multiple correlator techniques, the reader is directed to the patent application entitled, "System and Method of using Multiple Correlator Receivers in an Impulse Radio System", Ser. No. 09/537,264, filed Mar. 29, 2000 and assigned to the assignee of the present invention. This patent application is incorporated herein by reference.

Fast Locking Mechanisms

Methods to improve the speed at which a receiver can acquire and lock onto an incoming impulse radio signal have been developed. In one approach, a receiver comprises an adjustable time base to output a sliding periodic timing signal having an adjustable repetition rate and a decode timing modulator to output a decode signal in response to the periodic timing signal. The impulse radio signal is cross-correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by one or more extra counts after each T pulses is reached in order to shift the code modulo for proper phase alignment of the periodic timing signal and the received impulse radio signal. This method is described in detail in U.S. Pat. No. 5,832,035 to Fullerton, incorporated herein by reference.

In another approach, a receiver obtains a template pulse train and a received impulse radio signal. The receiver compares the template pulse train and the received impulse radio signal to obtain a comparison result. The system performs a threshold check on the comparison result. If the comparison result passes the threshold check, the system locks on the received impulse radio signal. The system may also perform a quick check, a synchronization check, and/or a command check of the impulse radio signal. For greater elaboration of this approach, the reader is directed to the patent application entitled, "Method and System for Fast Acquisition of Ultra Wideband Signals", Ser. No. 09/538,292, filed Mar. 29, 2000 and assigned to the assignee of the present invention. This patent application is incorporated herein by reference.

Baseband Signal Converters

A receiver has been developed which includes a baseband signal converter device and combines multiple converter circuits and an RF amplifier in a single integrated circuit package. Each converter circuit includes an integrator circuit that integrates a portion of each RF pulse during a sampling period triggered by a timing pulse generator. The integrator capacitor is isolated by a pair of Schottky diodes connected to a pair of load resistors. A current equalizer circuit equalizes the current flowing through the load resistors when the integrator is not sampling. Current steering logic transfers load current between the diodes and a constant bias circuit depending on whether a sampling pulse is present.

For greater elaboration of utilizing baseband signal converters, the reader is directed to U.S. Pat. No. 6,421,389 entitled, "Baseband Signal Converter for a Wideband Impulse Radio Receiver" and assigned to the assignee of the present invention. This patent is incorporated herein by reference.

Power Control and Interference

Power Control

Power control improvements have been invented with respect to impulse radios. The power control systems comprise a first transceiver that transmits an impulse radio signal to a second transceiver. A power control update is calculated according to a performance measurement of the signal received at the second transceiver. The transmitter power of either transceiver, depending on the particular embodiment, is adjusted according to the power control update. Various performance measurements are employed according to the current invention to calculate a power control update, including bit error rate, signal-to-noise ratio, and received signal strength, used alone or in combination. Interference is thereby reduced, which is particularly important where multiple impulse radios are operating in close proximity and their transmissions interfere with one another. Reducing the transmitter power of each radio to a level that produces satisfactory reception increases the total number of radios that can operate in an area without saturation. Reducing transmitter power also increases transceiver efficiency.

For greater elaboration of utilizing baseband signal converters, the reader is directed to the patent application entitled, "System and Method for Impulse Radio Power Control", Ser. No. 09/332,501, filed Jun. 14, 1999 and assigned to the assignee of the present invention. This patent application is incorporated herein by reference.

Mitigating Effects of Interference

To assist in mitigating interference to impulse radio systems a methodology has been invented. The method comprises the steps of: (a) conveying the message in packets; (b) repeating conveyance of selected packets to make up a repeat package; and (c) conveying the repeat package a plurality of times at a repeat period greater than twice the occurrence period of the interference. The communication may convey a message from a proximate transmitter to a distal receiver, and receive a message by a proximate receiver from a distal transmitter. In such a system, the method comprises the steps of: (a) providing interference indications by the distal receiver to the proximate transmitter; (b) using the interference indications to determine predicted noise periods; and (c) operating the proximate transmitter to convey the message according to at least one of the following: (1) avoiding conveying the message during noise periods; (2) conveying the message at a higher power during noise periods; (3) increasing error detection coding in the message during noise periods; (4) re-transmitting the message following noise periods; (5) avoiding conveying the message when interference is greater than a first strength; (6) conveying the message at a higher power when the interference is greater than a second strength; (7) increasing error detection coding in the message when the interference is greater than a third strength; and (8) re-transmitting a portion of the message after interference has subsided to less than a predetermined strength.

For greater elaboration of mitigating interference to impulse radio systems, the reader is directed to the patent application entitled, "Method for Mitigating Effects of Interference in Impulse Radio Communication", Ser. No. 09/587,033, filed Jun. 02, 1999 and assigned to the assignee of the present invention. This patent application is incorporated herein by reference.

Moderating Interference while Controlling Equipment

Yet another improvement to impulse radio includes moderating interference with impulse radio wireless control of an appliance; the control is affected by a controller remote from the appliance transmitting impulse radio digital control signals to the appliance. The control signals have a transmission power and a data rate. The method comprises the steps of: (a) in no particular order: (1) establishing a maximum acceptable noise value for a parameter relating to interfering signals; (2) establishing a frequency range for measuring the interfering signals; (b) measuring the parameter for the interference signals within the frequency range; and (c) when the parameter exceeds the maximum acceptable noise value, effecting an alteration of transmission of the control signals.

For greater elaboration of moderating interference while effecting impulse radio wireless control of equipment, the reader is directed to the patent application entitled, "Method and Apparatus for Moderating Interference While Effecting Impulse Radio Wireless Control of Equipment", Ser. No. 09/586,163, filed Jun. 2, 1999 and assigned to the assignee of the present invention. This patent application is incorporated herein by reference.

Coding Advances

The improvements made in coding can directly improve the characteristics of impulse radio as used in the present invention. Specialized coding techniques may be employed to establish temporal and/or non-temporal pulse characteristics such that a pulse train will possess desirable properties. Coding methods for specifying temporal and non-temporal pulse characteristics are described in commonly owned, co-pending applications entitled "A Method and Apparatus for Positioning Pulses in Time", Ser. No. 09/592,249, and "A Method for Specifying Non-Temporal Pulse Characteristics", Ser. No. 09/592,250, both filed Jun. 12, 2000, and both of which are incorporated herein by reference. Essentially, a temporal or non-temporal pulse characteristic value layout is defined, an approach for mapping a code to the layout is specified, a code is generated using a numerical code generation technique, and the code is mapped to the defined layout per the specified mapping approach.

A temporal or non-temporal pulse characteristic value layout may be fixed or non-fixed and may involve value ranges, discrete values, or a combination of value ranges and discrete values. A value range layout specifies a range of values for a pulse characteristic that is divided into components that are each subdivided into subcomponents, which can be further subdivided, ad infinitum. In contrast, a discrete value layout involves uniformly or non-uniformly distributed discrete pulse characteristic values. A non-fixed layout (also referred to as a delta layout) involves delta values relative to some reference value such as the characteristic value of the preceding pulse. Fixed and non-fixed layouts, and approaches for mapping code element values to them, are described in co-owned, co-pending applications, entitled "Method for Specifying Pulse Characteristics using Codes", Ser. No. 09/592,290 and "A Method and Apparatus for Mapping Pulses to a Non-Fixed Layout", Ser. No. 09/591,691, both filed on Jun. 12, 2000 and both of which are incorporated herein by reference.

A fixed or non-fixed characteristic value layout may include one or more non-allowable regions within which a characteristic value of a pulse is not allowed. A method for specifying non-allowable regions to prevent code elements from mapping to non-allowed characteristic values is described in co-owned, co-pending application entitled "A Method for Specifying Non-Allowable Pulse Characteristics", Ser. No. 09/592,289, filed Jun. 12, 2000 and incorporated herein by reference. A related method that conditionally positions pulses depending on whether or not code elements map to non-allowable regions is described in co-owned, co-pending application, entitled "A Method and Apparatus for Positioning Pulses Using a Layout having Non-Allowable Regions", Ser. No. 09/592,248 and incorporated herein by reference.

Typically, a code consists of a number of code elements having integer or floating-point values. A code element value may specify a single pulse characteristic (e.g., pulse position in time) or may be subdivided into multiple components, each specifying a different pulse characteristic. For example, a code having seven code elements each subdivided into five components (c0–c4) could specify five different characteristics of seven pulses. A method for subdividing code elements into components is described in commonly owned, co-pending application entitled "Method for Specifying Pulse Characteristics using Codes", Ser. No. 09/592,290, filed Jun. 12, 2000 previously referenced and again incorporated herein by reference. Essentially, the value of each code element or code element component (if subdivided) maps to a value range or discrete value within the defined characteristic value layout. If a value range layout is used an offset value is typically employed to specify an exact value within the value range mapped to by the code element or code element component.

The signal of a coded pulse train can be generally expressed:

$$s_{tr}^{(k)}(t) = \sum_j (-1)^{f_j^{(k)}} a_j^{(k)} \omega(c_j^{(k)} t - T_j^{(k)}, b_j^{(k)})$$

where k is the index of a transmitter, j is the index of a pulse within its pulse train, $(-1)f_j^{(k)}, a_j^{(k)}, c_j^{(k)}$, and $b_j^{(k)}$ are the coded polarity, amplitude, width, and waveform of the jth pulse of the kth transmitter, and $T_j^{(k)}$ is the coded time shift of the jth pulse of the kth transmitter. Note: When a given non-temporal characteristic does not vary (i.e., remains constant for all pulses in the pulse train), the corresponding code element component is removed from the above expression and the non-temporal characteristic value becomes a constant in front of the summation sign.

Various numerical code generation methods can be employed to produce codes having certain correlation and spectral properties. Such codes typically fall into one of two categories: designed codes and pseudorandom codes.

A designed code may be generated using a quadratic congruential, hyperbolic congruential, linear congruential, Costas array or other such numerical code generation technique designed to generate codes guaranteed to have certain correlation properties. Each of these alternative code generation techniques has certain characteristics to be considered in relation to the application of the pulse transmission system employing the code. For example, Costas codes have nearly ideal autocorrelation properties but somewhat less than ideal cross-correlation properties, while linear congruential codes have nearly ideal cross-correlation properties but less than ideal autocorrelation properties. In some cases, design tradeoffs may require that a compromise between two or more code generation techniques be made such that a code is generated using a combination of two or more techniques. An example of such a compromise is an extended quadratic congruential code generation approach that uses two 'independent' operators, where the first operator is linear and the second operator is quadratic. Accordingly, one, two, or more code generation techniques or combinations of such techniques can be employed to generate a code without departing from the scope of the invention.

A pseudorandom code may be generated using a computer's random number generator, binary shift-register(s) mapped to binary words, a chaotic code generation scheme, or another well-known technique. Such 'random-like' codes are attractive for certain applications since they tend to spread spectral energy over multiple frequencies while having 'good enough' correlation properties, whereas designed codes may have superior correlation properties but have spectral properties that may not be as suitable for a given application.

Computer random number generator functions commonly employ the linear congruential generation (LCG) method or the Additive Lagged-Fibonacci Generator (ALFG) method. Alternative methods include inversive congruential generators, explicit-inversive congruential generators, multiple recursive generators, combined LCGs, chaotic code generators, and Optimal Golomb Ruler (OGR) code generators. Any of these or other similar methods can be used to generate a pseudorandom code without departing from the scope of the invention, as will be apparent to those skilled in the relevant art.

Detailed descriptions of code generation and mapping techniques are included in a co-owned patent application entitled "A Method and Apparatus for Positioning Pulses in Time", Ser. No. 09/638,150, filed Aug. 15, 2000, which is hereby incorporated by reference.

It may be necessary to apply predefined criteria to determine whether a generated code, code family, or a subset of a code is acceptable for use with a given UWB application. Criteria to consider may include correlation properties, spectral properties, code length, non-allowable regions, number of code family members, or other pulse characteristics. A method for applying predefined criteria to codes is described in co-owned, co-pending application, entitled "A Method and Apparatus for Specifying Pulse Characteristics using a Code that Satisfies Predefined Criteria", Ser. No. 09/592,288, filed Jun. 12, 2000 and is incorporated herein by reference.

In some applications, it may be desirable to employ a combination of two or more codes. Codes may be combined sequentially, nested, or sequentially nested, and code combinations may be repeated. Sequential code combinations typically involve transitioning from one code to the next after the occurrence of some event. For example, a code with properties beneficial to signal acquisition might be employed until a signal is acquired, at which time a different code with more ideal channelization properties might be used. Sequential code combinations may also be used to support multicast communications. Nested code combinations may be employed to produce pulse trains having desirable correlation and spectral properties. For example, a designed code may be used to specify value range components within a layout and a nested pseudorandom code may be used to randomly position pulses within the value range components. With this approach, correlation properties of the designed code are maintained since the pulse positions specified by the nested code reside within the value range components specified by the designed code, while the random positioning of the pulses within the components results in desirable spectral properties. A method for applying code combinations is described in co-owned, co-pending application, entitled "A Method and Apparatus for Applying Codes Having Pre-Defined Properties", Ser. No. 09/591,690, filed Jun. 12, 2000 which is incorporated herein by reference.

Impulse Radio Interactive Wireless Gaming System and Method

Figure 9:
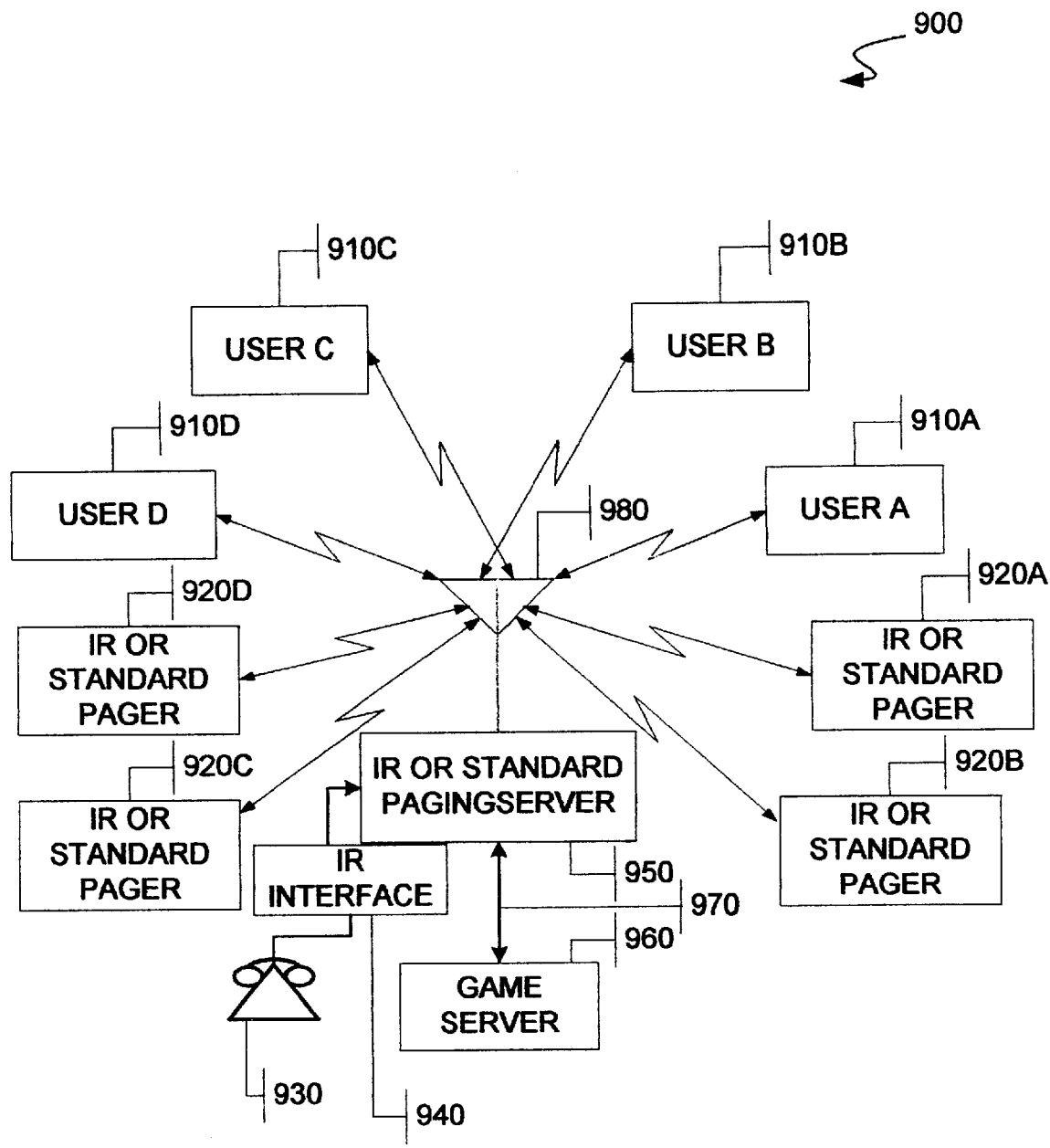
FIG. 9 is a block diagram of an impulse radio interactive wireless gaming system in accordance with the present invention.

Reference is directed to FIG. 9, in which Like numerals indicate like elements throughout the several views, which shows a general block diagram of an interactive impulse radio wireless gaming system 900 of the present invention. In a preferred embodiment of the present invention, a plurality of impulse radio wireless gaming units, represented as four impulse radio wireless gaming units 910A–D are shown which receive and transmit via impulse radio means periodically updated data signals from and to a game server 960. The impulse radio interactive wireless gaming system 900 provides full duplex operation between gaming units 910A–D and the game server 960 using unique impulse radio channelization techniques described above and in the patents and patent applications incorporated herein by reference. Other methods of duplexing using impulse radios that have been described in the patents and patent applications herein incorporated by reference can also be used. The impulse radio duplex operation allows each gaming unit 910A–D to operate alternately as a host device and as a guest device to transmit and receive data signals to and from the gaming unit 910A–D and the game server 960. It will be appreciated that in such an interactive wireless gaming system 900 as described, games played using the wireless gaming units 910A–D of the present invention can typically be played between two or more players, and can be relatively fast paced, such as action games engaging one player against another, as will be described in further detail below.

Referring also to FIG. 9, in an alternate embodiment of the present invention, a plurality of impulse radio wireless gaming units, represented as four impulse radio wireless gaming units 910A–D receive and transmit periodically updated data signals from and to a game server 960 over the impulse radio two-way paging system which also includes impulse radio pagers 920A–D four of which are shown by way of example, and which can receive paging messages originated from a page origination device, such as a telephone 930 in communication with an impulse radio paging server 950 via an impulse radio interface 940, in a manner well known to one of ordinary skill in the art of impulse radio technology. While impulse radio pagers are shown that can be two way pagers, conventional one way, or receive only pagers can be utilized albeit with less performance enhancements. It will also be appreciated that paging transceivers using existing wireless techniques which can receive messages and which can also provide an acknowledge back response can be utilized within the interactive impulse radio wireless gaming system as well. It will be appreciated that due to limitations in queuing of messages for transmission in such a conventional paging system, games played using the wireless gaming units 910A–D of the present invention would typically be limited to relatively slow paced games played between two or more players, such a chess game or other game of strategy, so as to not conflict with the regular paging traffic.

In any of the embodiments of the present invention described above, the game server 960, through a local area network 970, communicates with the impulse radio paging server 950 which controls the transmission and reception of periodically updated data signals to and from a impulse radio paging base station, depicted by ultra wide band antenna 980. In addition, the periodically transmitted data signals, as will be described below, can include periodically updated relative position signals which are transmitted through the ultra wide band antenna 980 by the game server 960 via the impulse radio paging server 950. It is appreciated that the position determination of each gaming unit 920A–D can be determined using the novel position determination techniques enabled by impulse radio technology described in detail above and in the patents and patent applications herein incorporated by reference.

Figure 10:
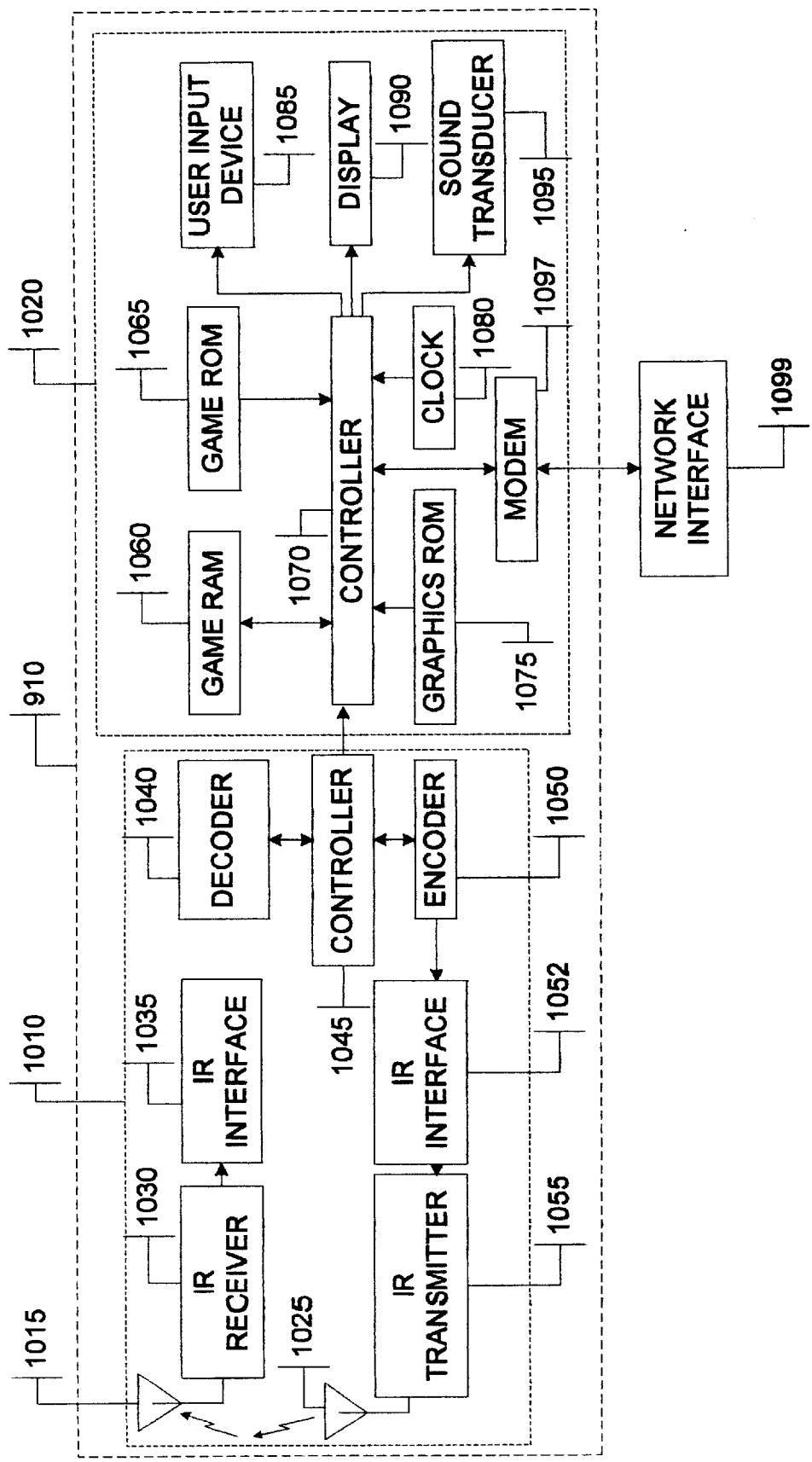
FIG. 10 is an electrical block diagram of a preferred embodiment of the impulse radio interactive wireless gaming unit in accordance with the present invention.

Turning now to FIG. 10 of the drawings, a preferred embodiment of one of a plurality of interactive impulse radio wireless gaming units 910 is generally illustrated by reference numerals 1010 and 1020 representing a impulse radio paging transceiver and a wireless gaming unit processor, respectively. In particular, the impulse radio paging transceiver 1010 comprises an ultra wide band receiving antenna 1015, an impulse radio transmitting ultra wide band antenna 1025, an impulse radio receiver 1030, an impulse radio interface 1035 output to decoder 1040, an impulse radio transceiver controller 1045, an encoder 1050, and an impulse radio transmitter 1055. The impulse radio wireless gaming unit processor 1020 comprises a game random access memory (RAM) 1060, a game read only memory (ROM) 1065, an impulse radio wireless gaming unit controller 1070, a graphics ROM 1075, a clock 1080, a user input device 1085, a display 1090, a sound transducer 1095, and optionally a modem 1097.

In the preferred embodiment, the receiving ultra wide band antenna 1015 is coupled to the impulse radio receiver 1030 for receiving and detecting transmitted selective call paging signals and periodically updated data signals. A serial stream of data is provided at the output of impulse radio receiver 1030 corresponding to the selective call paging signals and the periodically updated data signals received via impulse radio wireless means. The selective call paging signals are coupled to a decoder 1040, via an optional impulse radio interface 1035 to facilitate communication, which is implemented using a microprocessor in a manner well known to one of ordinary skill in the art. The decoder 1040 communicates with a an impulse radio transceiver controller 1045 which is responsive to a plurality of control signals generated by the decoder 1040. The paging impulse radio transceiver controller 1045 communicates with an encoder 1050 and an impulse radio transmitter 1055 via an impulse radio interface 1052 along with the transmitting ultra wide band antenna 1025 to allow for the dissemination of a plurality of control signals and data signals. While a separate ultra wide band receiving antenna 1015 and transmitting antenna 1025 are shown in FIG. 10, it will be appreciated that a single receiving/transmitting antenna suitably coupled to the receiver 1030 and to the transmitter 1055 can be utilized to receive and transmit the periodically updated data signals as well.

Turning now to the impulse radio wireless gaming unit processor 1020, gaming information received is sequentially stored as periodically updated data signals in a memory 1060 represented by a game RAM under the control of an impulse radio wireless gaming unit controller 1070 which is responsive to the plurality of control signals output from controller 1045. The impulse radio wireless gaming unit controller 1070 can be a standard industry microprocessor. Information, including graphics characterizations, which has been selected for display from game RAM 1060 is exhibited through a display 1090, such as an LCD display, under the control of the impulse radio wireless gaming unit controller 1070. The graphic characterizations which are displayed can be individually animated during the time interval between the periodic updates of the data signals, adding further to the realism of the game as will be further described below. The data signals include relative position signals which provide a relative position of the graphic characterizations which represent a plurality of moveable objects when displayed. The relative position signals represent a plurality of incremental positions of the moveable objects on the display. Information stored in game RAM 1060 may be accessed through a user input device 1085.

Game ROM 1065 contains all the firmware routines and instructions required by the impulse radio wireless gaming unit controller 1070 which is necessary to store and to display the received information. Game ROM 1065 also contains all of the menus required to select the readout of stored information as well as graphic representations of the plurality of moveable objects which are provided in conjunction with a graphics ROM 1075.

The wireless gaming unit 910 of the present invention, in addition can have means for coupling to a telephone network for receiving and communicating additional information directly to a central location, such as a game server. This is accomplished through a modem 1097 and a network interface 1099. Verbal communications are further possible through the use of a sound transducer 1095.

Figure 11:
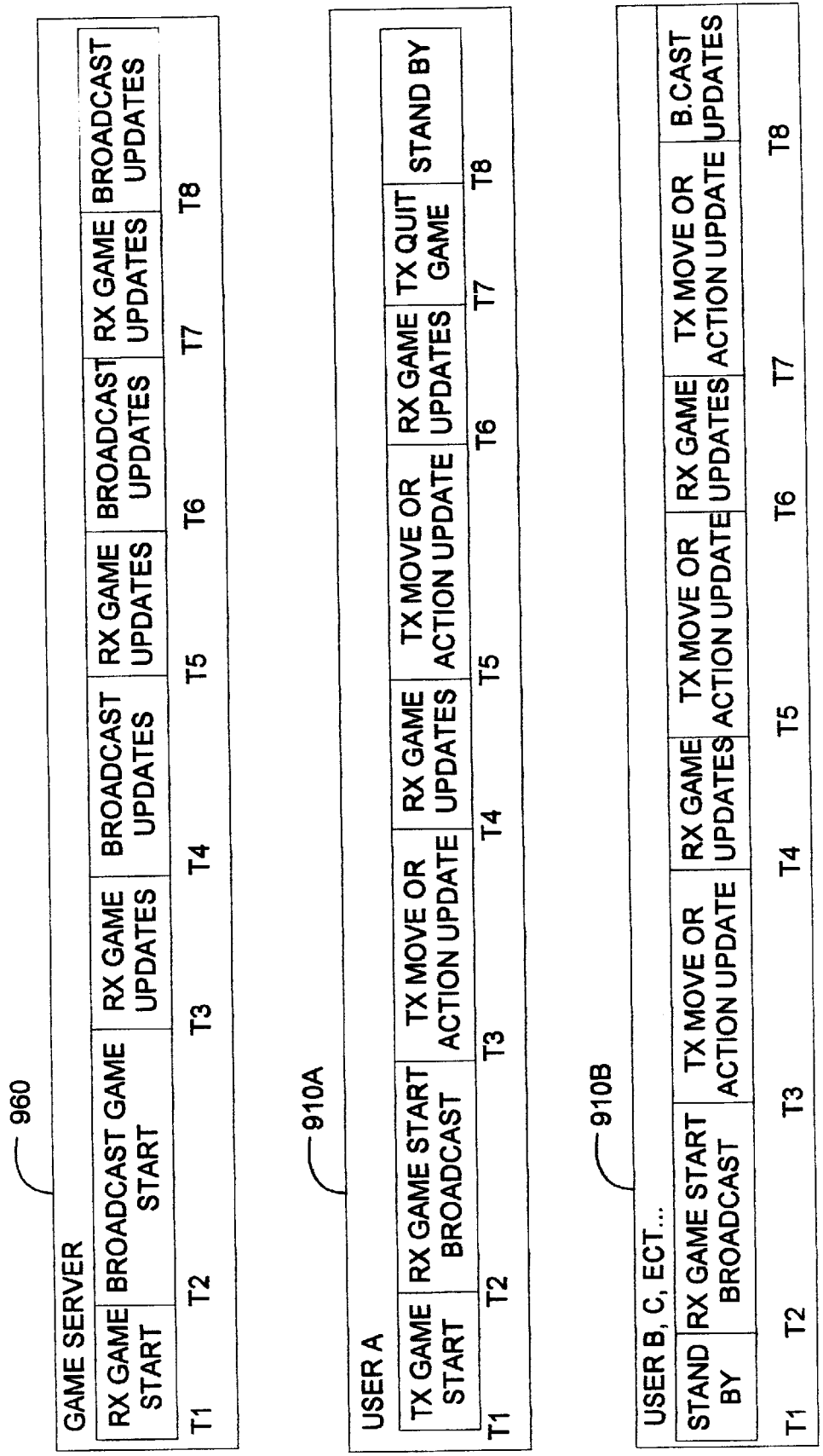
FIG. 11 is a timing diagram of the interactive impulse radio wireless gaming system showing typical system signaling strategies in the preferred embodiment according to the present invention.

Reference is next directed to FIG. 11 which shows a timing diagram depicting typical system signaling strategies for transmitting and receiving wireless messages which include gaming information generated by the gaming units 910A–D in accordance with the preferred embodiment of the present invention. A gaming session is initiated at time T1 which begins with the game server 960 receiving a control signal transmitted by User A 910A. User B 910B remains on a standby mode during this period. At time T2, the game server 960 transmits a game start signal which is received by User A and User B, 910A and 910B respectively, as a "Start Broadcast" signal. Also at the time T2, a paging signal may be sent to User B 910B to act to provide an alert signaling the initiation of a gaming session. The alert can be audible, visual, or audible and visual. At time T3, Users A and B, 910A and 910B respectively, transmit a data signal signifying a movement in a graphic characterization or another action update while the game server 960 receives the data signals. At time T4, the game server 960 transmits updated data signals which are received by Users A and 13, 910A and 910B respectively. This process continues throughout time T5 and T6 until time T7 is reached at which the game server 960 receives a control signal signifying the end of the gaming session from User A 910A. User B 910B continues to transmit either a movement in a graphic characterization or another action update at time T7. At time T8, the game server 960 transmits a final update received by User B 910B while User A 910A remains in a standby mode in preparation for another gaming session. It will be appreciated that FIG. 11 is exemplary of a typical gaming session which may progress over a period of seconds to hours.

Figure 12:
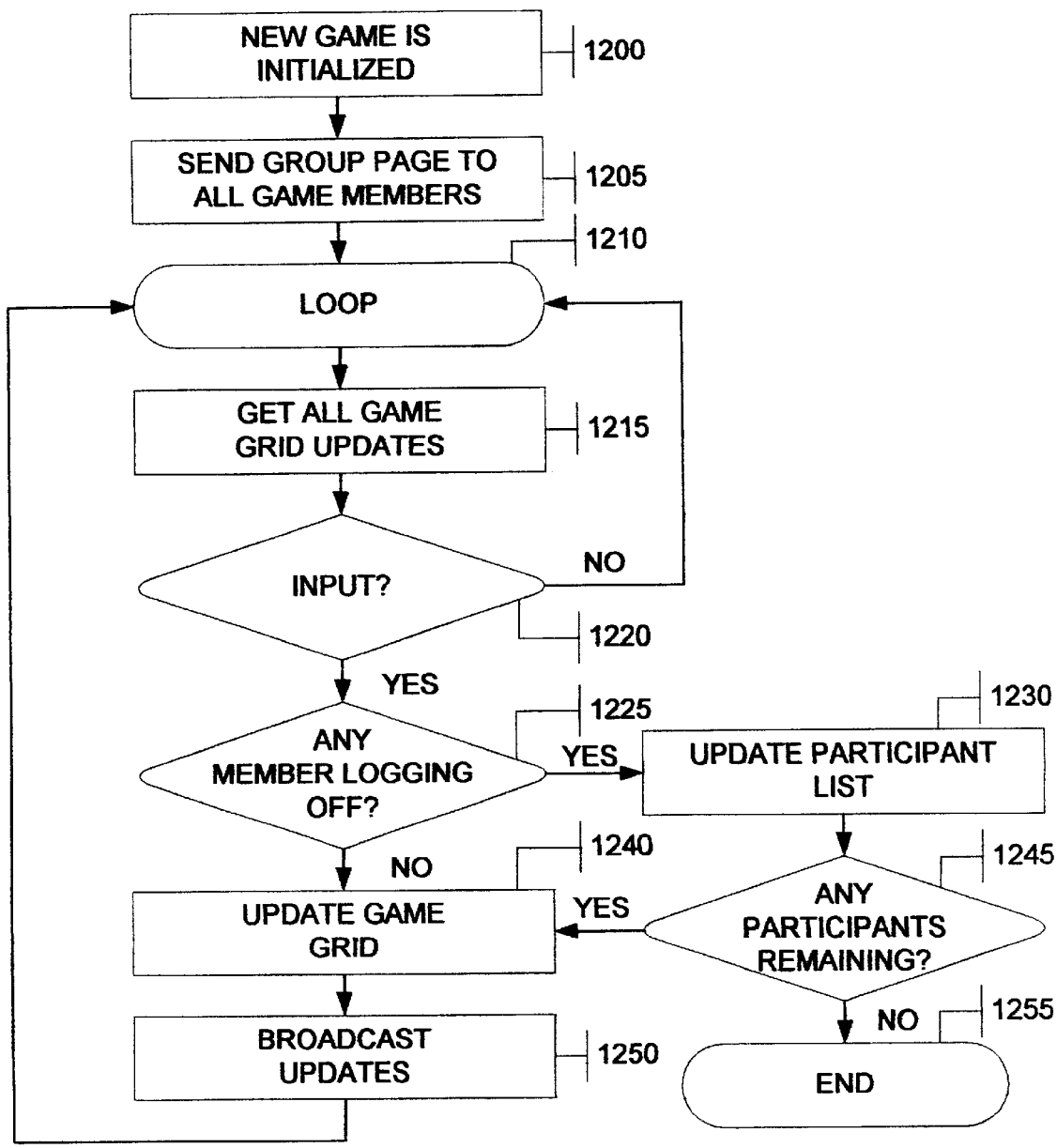
FIG. 12 is a flowchart of the interactive impulse radio wireless gaming system showing the host operation in the preferred embodiment according to the present invention.

Turning now to FIG. 12, a flowchart showing the operation of a host device in the preferred embodiment of the present invention is depicted. As data is processed by the game server 960, a new gaming session is initialized as shown in block 1200. A number of gaming users can be selected by the gaming user and a page is sent via the game server 960 to other gaming members to alert them as to the starting time as well as ending time of a particular gaming session as shown in block 1205. A looping sequence is next entered at block 1210 whereupon the gaming users provide updates to all information regarding the current game, such as graphic characterizations and other gaming information in block 1215, after which at the appropriate time the information is broadcast. When the input signal at block 1220 is not received by the game server 960 from the gaming units, the looping sequence 1210 begins anew. When the input signal at block 1220 is received from the gaming units, the information received is checked as to whether the gaming user responding is logging on, logging off, or updating information at block 1225. When the gaming user is logging off at block 1225, a member participant list is updated at block 1230 from the information received in block 1225, and then checked as to whether any gaming users remain at block 1245, at which point, if no other gaming users remain, the gaming session is terminated as shown in block 1255. If gaming users remain, or when new gaming users log on at block 1225, the game grid including graphic characterizations as well as other information provided by the gaming users is updated at block 1240, and the updates are broadcast by the game server 960 at block 1250, and the looping sequence of block 1210 begins again.

Figure 13:
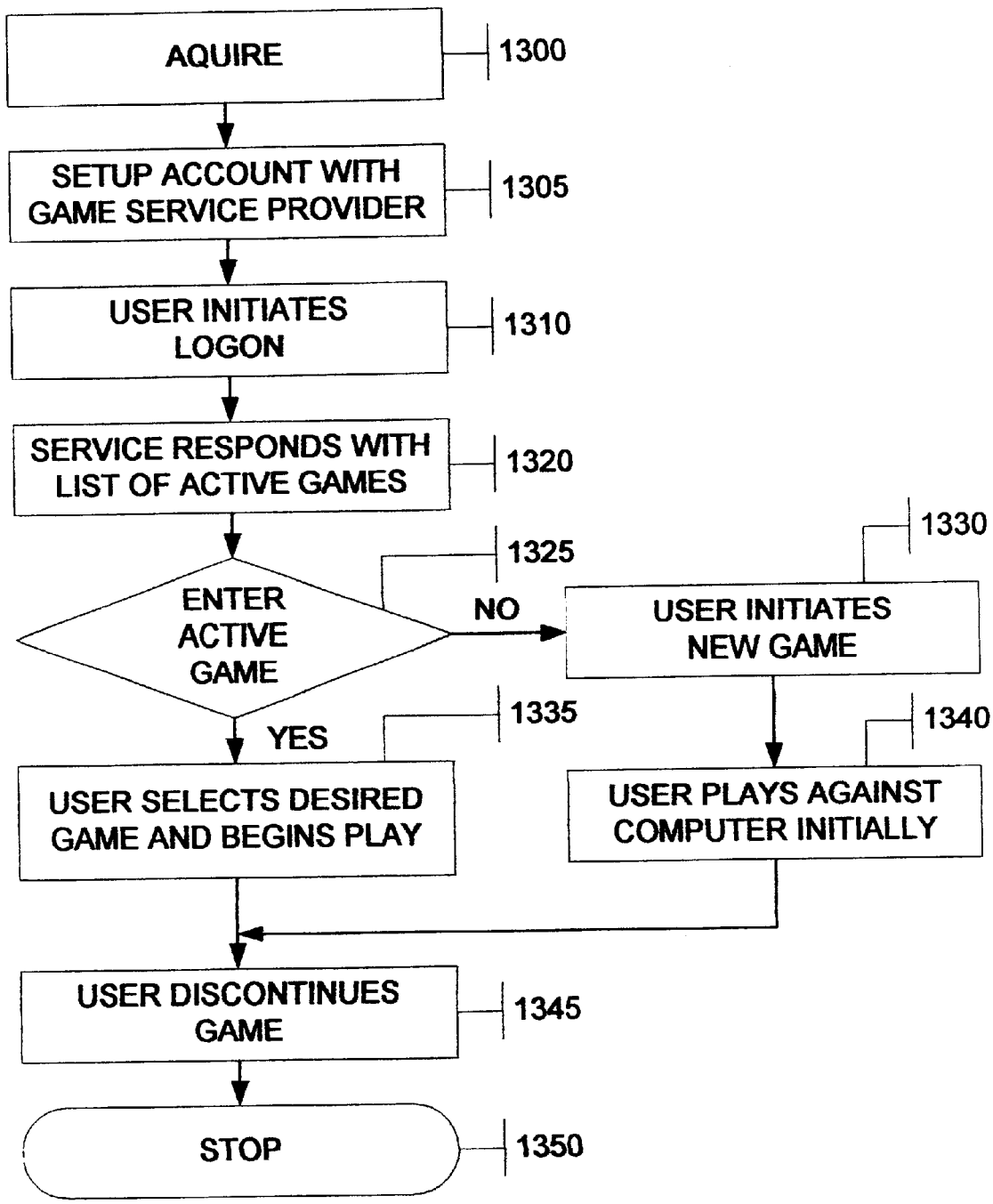
FIG. 13 is a flowchart of the interactive impulse wireless gaming system showing distributive interactive gaming in the preferred embodiment according to the present invention.

Turning next to FIG. 13, a basic system flow diagram is shown for the preferred embodiment of the present invention. Software is first acquired from any number of sources which are apparent to those skilled in the art as shown in block 1300. An active account is next created with a game service provider such as America On-Line or Compuserve as shown in block 1305. Also, a local game can be established with the game server 960 included in a device such as the Sony Game Station trade named, "Sony Play Station." It is also understood that any other gaming device with concomitant server can be utilized herein. Once the account is created, the gaming user initiates a standard logon procedure at block 1310 at which time the game server 960 responds with a current list of active gaming sessions ready to begin or already in progress as shown in block 1320. The gaming user is then given a choice whether to enter an active gaming session at block 1325 or initiate a new gaming session at block 1330. When the gaming user initiates a new game, the gaming user may initially play against a computer at step 1340 if no other gaming users are available. When the gaming user enters an active gaming session at block 1325, a decision is made as to which gaming session to enter and the session is initiated at block 1335. At the end of the gaming session or at any time earlier, the user may discontinue the gaming session at block 1345 and the session is ended as shown in block 1350.

Figure 14:
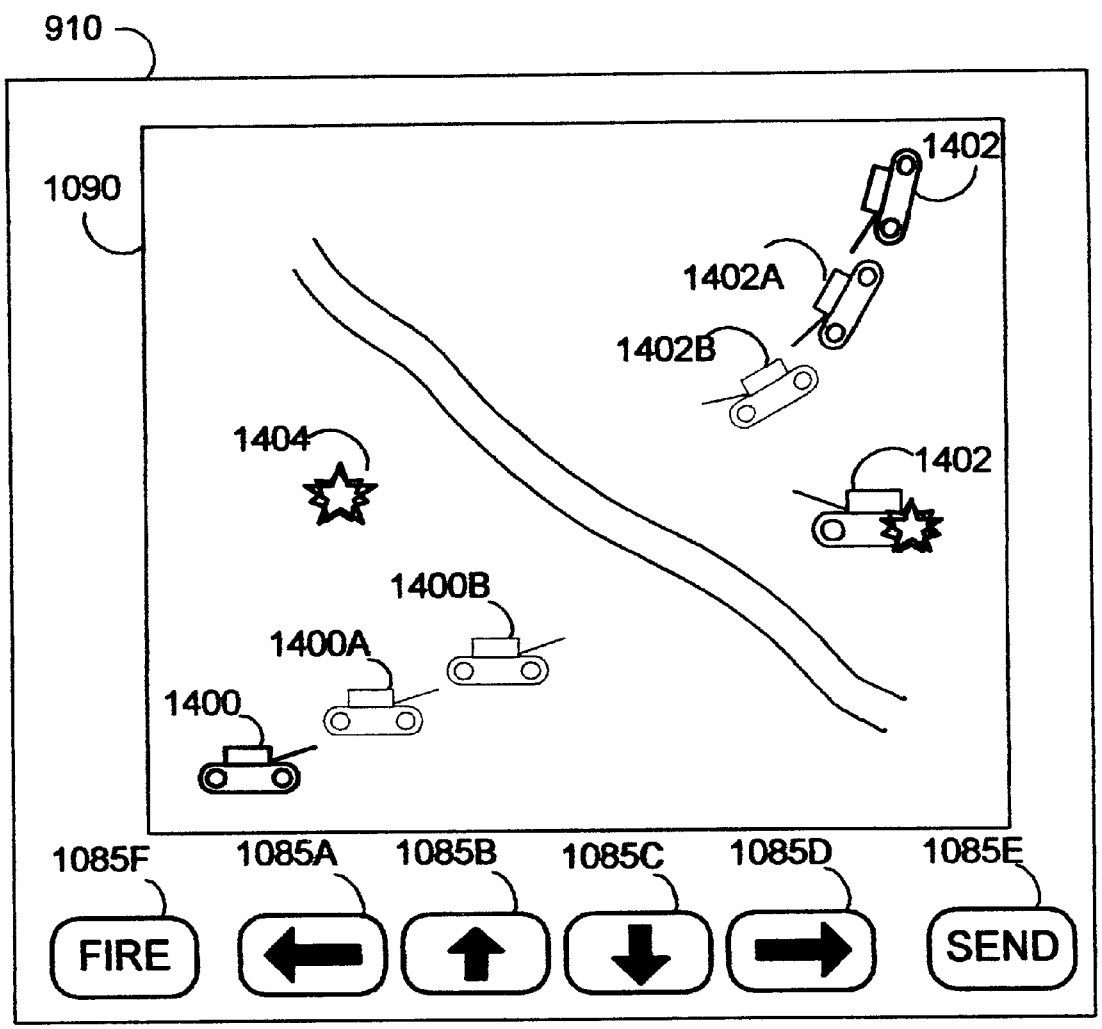
FIG. 14 is a graphic illustration showing a typical animation sequence in the preferred embodiment according to the present invention.

Reference is next directed to FIG. 14 which shows a typical animation sequence within a wireless gaming session, and which by way of example shows a graphic characterization of a tank battle as provided by the preferred embodiment of the present invention. A gaming unit 910 having a display 1090 and user input devices 1085A through 1085F is generally shown. Present positions of movable objects 1400 and 1402 are depicted as graphic characterizations of battle-tanks displayed at a given instance of time on the display 1090. Relative positions 1400A, 1400B, 1402A, and 1402B, representing a change in position of the movable objects 1400 and 14020, relative to a prior position or relative to the position of another movable object, and are encoded through the process described in FIG. 10 to provide relative position signals for transmission. The relative position signals represent a plurality of incremental positions of the moveable objects 1400 and 1402 on the display 1020. Further, individually animated graphic characterizations can be provided, such as graphic characterization 1404 and 1406 which depict, for example, growing from small to large and representing an actual event, an explosion of an artillery shell.

In summary, an impulse radio interactive wireless gaming system has been described above which includes a plurality of impulse radio wireless gaming units operating alternately as a host device and a guest device over a communication system such as provided by a dedicated impulse radio two-way paging system or a conventional two-way paging system or communicating directly with a local server with said local server possessing an impulse radio transceiver therein. The wireless gaming units include an impulse radio receiver for receiving wireless messages including gaming information generated by an impulse radio wireless gaming server or another impulse radio wireless gaming unit, the gaming information including data signals which are periodically updated and which indicate a present position of a plurality of moveable objects moving periodically as the data signals are updated. The wireless gaming units have a display for displaying the gaming information received in a form of graphic characterizations depicting moveable objects, a processor for providing updated gaming information at the gaming units, and a transmitter for transmitting wireless responses to the wireless gaming server or to another wireless gaming unit to provide the updated gaming information.

While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements which embody the spirit and scope of the present invention.

What is claimed is:

1. An impulse radio wireless gaming unit comprising:
   an impulse radio receiver for receiving impulse radio wireless messages including gaming information from a game server;
   a processor for generating updated gaming information; and
   an impulse radio transmitter for transmitting impulse radio wireless messages including the updated gaming information to said game server.

2. The impulse radio wireless gaming unit of claim 1, further comprising a display for displaying the received gaming information.

3. The impulse radio wireless gaming unit of claim 1, wherein said gaming unit and said game server use a dedicated outbound impulse radio channel and a dedicated inbound impulse radio channel to communicate with one another.

4. The impulse radio wireless gaming unit of claim 1, wherein said gaming information is in a form of graphic characterizations depicting moveable objects.

5. The impulse radio wireless gaming unit of claim 4, wherein said graphic characterizations are displayed and individually animated through a display of said gaming unit.

6. The impulse radio wireless gaming unit of claim 1, wherein said gaming information includes relative position signals to provide a relative position of the plurality of moveable objects, and wherein said processor is responsive to the relative position signals for generating the graphic characterizations corresponding to each of the relative position signals.

7. The impulse radio wireless gaming unit of claim 1, wherein said gaming unit can communicate interactively with said game server.

8. The impulse radio wireless gaming unit of claim 1, wherein said gaming unit can communicate interactively with another gaming unit through the game server.

9. The impulse radio wireless gaming unit of claim 1, wherein said gaming information is periodically preserved in memory to prevent a loss of said gaming information.

10. An impulse radio game server comprising:
    an impulse radio receiver for receiving impulse radio wireless messages including gaming information from a gaming unit;
    a processor for generating updated gaming information; and
    an impulse radio transmitter for transmitting impulse radio wireless messages including the updated gaming information to said gaming unit.

11. The impulse radio game server of claim 10, wherein said gaming unit and said game server use a dedicated outbound impulse radio channel and a dedicated inbound impulse radio channel to communicate with one another.

12. The impulse radio game server of claim 10, wherein said gaming unit can communicate interactively with another gaming unit through the game server.

13. An interactive impulse radio wireless gaming system comprising:
    a game server; and
    at least one impulse radio wireless gaming unit, wherein said gaming unit further comprises:
      an impulse radio receiver for receiving impulse radio wireless messages including gaming information from said game server;
      a processor for generating updated gaming information; and
      an impulse radio transmitter for transmitting impulse radio wireless messages including the updated gaming information to said game server.

14. The interactive impulse radio wireless gaming system of claim 13, wherein said gaming unit further includes a display for displaying the gaming information.

15. The interactive impulse radio wireless gaming system of claim 13, wherein said gaming unit and said game server use a dedicated outbound impulse radio channel and a dedicated inbound impulse radio channel to communicate with one another.

16. The interactive impulse radio wireless gaming system of claim 13, wherein said gaming unit can communicate interactively with said game server.

17. The interactive impulse radio wireless gaming system of claim 13, wherein said gaming unit can communicate interactively another gaming unit through the game server.

18. A method for providing interactive radio wireless gaming, said method comprising the steps of:
    transmitting gaming information between an impulse radio wireless gaming unit and an impulse radio game server; and
    displaying at least a portion of the gaming information for at least one user of the at least one impulse radio wireless gaming unit.

19. The method of claim 18, wherein said gaming unit and said game server use a dedicated outbound impulse radio channel and a dedicated inbound impulse radio channel to communicate with one another.

20. The method of claim 18, wherein said gaming unit can communicate interactively with said game server.

21. The method of claim 18, wherein said gaming unit can communicate interactively with another gaming unit through the game server.

* * * * *